United States Patent

Cook et al.

[11] Patent Number: 6,050,245
[45] Date of Patent: Apr. 18, 2000

[54] CANISTER VENT VALVE HAVING AT LEAST ONE SENSOR AND SINGLE ELECTRIC ACTUATOR OPERATIVELY CONNECTED TO A SINGLE ELECTRICAL CONNECTOR

[75] Inventors: John E. Cook; Paul D. Perry; Craig A. Weldon, all of Chatham, Canada

[73] Assignee: Siemens Canada Limited, Mississauga, Canada

[21] Appl. No.: 08/976,387

[22] Filed: Nov. 21, 1997

Related U.S. Application Data

[62] Division of application No. 08/798,818, Feb. 12, 1997.
[51] Int. Cl.[7] .................................................. F02M 33/02
[52] U.S. Cl. .......................................... 123/520; 123/458
[58] Field of Search .................................. 123/520, 521, 123/519, 518, 516, 458; 737/88, 487.5

[56] References Cited

U.S. PATENT DOCUMENTS

| 4,768,548 | 9/1988 | Maurer | 137/487.5 |
|---|---|---|---|
| 4,901,702 | 2/1990 | Beicht | 123/520 |
| 5,284,121 | 2/1994 | Abe | 123/520 |
| 5,388,607 | 2/1995 | Ramaker | 137/88 |
| 5,524,593 | 6/1996 | Denne | 123/458 |
| 5,630,403 | 5/1997 | Van Kampen | 123/520 |
| 5,657,962 | 8/1997 | Neron | 123/520 |
| 5,727,532 | 3/1998 | Everingham | 123/458 |

*Primary Examiner*—Carl S. Miller

[57] ABSTRACT

A vapor collection canister vent valve contains both an electric pressure sensor for measuring evaporative emission space pressure during a diagnostic test and an electric actuator for operating the vent valve closed during a diagnostic test. Use of the valve in an evaporative emission control system reduces the number of connections, both electrical and fluid, that are required to install the valve in a system. The remote location of the pressure sensor damps the effect of pressure transients, such as those due to tank fuel slosh, on the sensor.

19 Claims, 3 Drawing Sheets

CANISTER VENT VALVE HAVING AT LEAST ONE SENSOR AND SINGLE ELECTRIC ACTUATOR OPERATIVELY CONNECTED TO A SINGLE ELECTRICAL CONNECTOR

Division of Ser. No. 08/798,818 filed Feb. 12, 1997.

FIELD OF THE INVENTION

This invention relates generally to an on-board evaporative emission control system for a motor vehicle powered by an internal combustion engine and to a novel vent valve for a vapor collection canister of such a system.

BACKGROUND AND SUMMARY OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging collected vapors to an intake manifold of the engine. A known type of purge valve, sometimes called a canister purge solenoid (or CPS) valve, comprises a solenoid actuator that is under the control of a microprocessor-based engine management system.

During conditions conducive to purging, evaporative emission space that is cooperatively defined by the tank headspace and the canister is purged to the engine intake manifold through a canister purge solenoid valve connected between the canister and the engine intake manifold. The canister purge solenoid valve is opened by a signal from an engine management computer in an amount that allows intake manifold vacuum to draw volatile fuel vapors from the canister for entrainment with the combustible mixture passing into the engine's combustion chamber space at a rate consistent with engine operation to provide both acceptable vehicle driveability and an acceptable level of exhaust emissions.

Certain governmental regulations require that certain automotive vehicles powered by internal combustion engines which operate on volatile fuels such as gasoline, have their evaporative emission control systems equipped with on-board diagnostic capability for determining if a leak is present in the evaporative emission space. It has heretofore been proposed to make such a determination by temporarily creating a pressure condition in the evaporative emission space which is substantially different from the ambient atmospheric pressure, and then watching for a change in that substantially different pressure which is indicative of a leak.

It is believed fair to say that there are two basic types of diagnostic systems for determining integrity of the evaporative emission space against leakage.

Commonly owned U.S. Pat. No. 5,146,902 "Positive Pressure Canister Purge System Integrity Confirmation" discloses one type: namely, a system and method for making a leakage determination by pressurizing the evaporative emission space to a certain positive pressure therein (the word "positive" meaning relative to ambient atmospheric pressure) and then watching for a drop in positive pressure indicative of a leak.

The other type makes a leakage determination by creating in the evaporative emission space a certain negative pressure (the word "negative" meaning relative to ambient atmospheric pressure so as to denote vacuum) and then watching for a loss of vacuum indicative of a leak. A known procedure employed by this latter type of system in connection with a diagnostic test comprises utilizing engine manifold vacuum to create vacuum in the evaporative emission space. Because that space may, at certain non-test times, be vented through the canister to allow vapors to be efficiently purged when the CPS valve is opened for purging of the canister, it is known to communicate the canister vent port to atmosphere through a vent valve that is open when vapors are being purged to the engine, but that closes preparatory to a diagnostic test so that a desired test vacuum can be drawn in the evaporative emission space for the test. Once a desired vacuum has been drawn, the purge valve is closed. Leakage is reflected by a loss of vacuum during the length of the test time after the purge valve has been operated closed.

In order for the engine management computer to ascertain when the desired vacuum has been drawn so that it can command the purge valve to close, and for loss of vacuum to thereafter be detected, it is known to employ an electric sensor, or transducer, that measures negative pressure, i.e. vacuum, in the evaporative emission space by supplying a measurement signal to the management computer. It is known to mount this sensor on the vehicle's fuel tank where it will be exposed to the tank headspace. For example, commonly assigned U.S. Pat. No. 5,267,470 discloses a pressure sensor mounting in conjunction with a fuel tank roll-over valve.

In one respect, the present invention is directed to a novel vapor collection canister vent valve that comprises both a device for providing an electric signal related to pressure, either positive, negative, or both, in evaporative emission space during a diagnostic test and an electric actuator for operating the vent valve closed during a diagnostic test.

In another respect, the present invention is directed to a novel evaporative emission control system in which both an electric actuator for closing a vapor collection canister vent valve during a diagnostic test and a device for providing an electric signal related to pressure, either positive, negative, or both, in evaporative emission pressure during a diagnostic test are embodied in a single assembly.

The invention provides a number of important advantages. Use of the inventive valve in an evaporative emission control system reduces the number of connections, both electrical and fluid, that are required to install the valve in a new vehicle in a vehicle assembly plant. Accordingly, less in-plant labor time is needed. Moreover, reliability is improved because fewer connections reduces the probability of a faulty connection with another system component. Because the pressure sensor is now physically disposed on the vent side of the flow path through the canister, it is believed to be less sensitive to pressure fluctuations on the evaporative emission space side of the canister, thereby providing a degree of damping of the pressure signal, while retaining signal accuracy. The inventive valve is well-suited for mass-production fabrication, including the use of automated assembly techniques, thereby providing for cost-effective manufacture. Other advantageous aspects relate to various constructional details of the valve.

The foregoing, along with additional features, advantages, and benefits of the invention, will be seen in the ensuing description and claims which should be considered in conjunction with the accompanying drawings. The drawings disclose a presently preferred embodiment of the invention according to the best mode contemplated at this time for carrying out the invention.

DESCRIPTION OF THE PREFERRED EMBODIMENT

Figure 1:
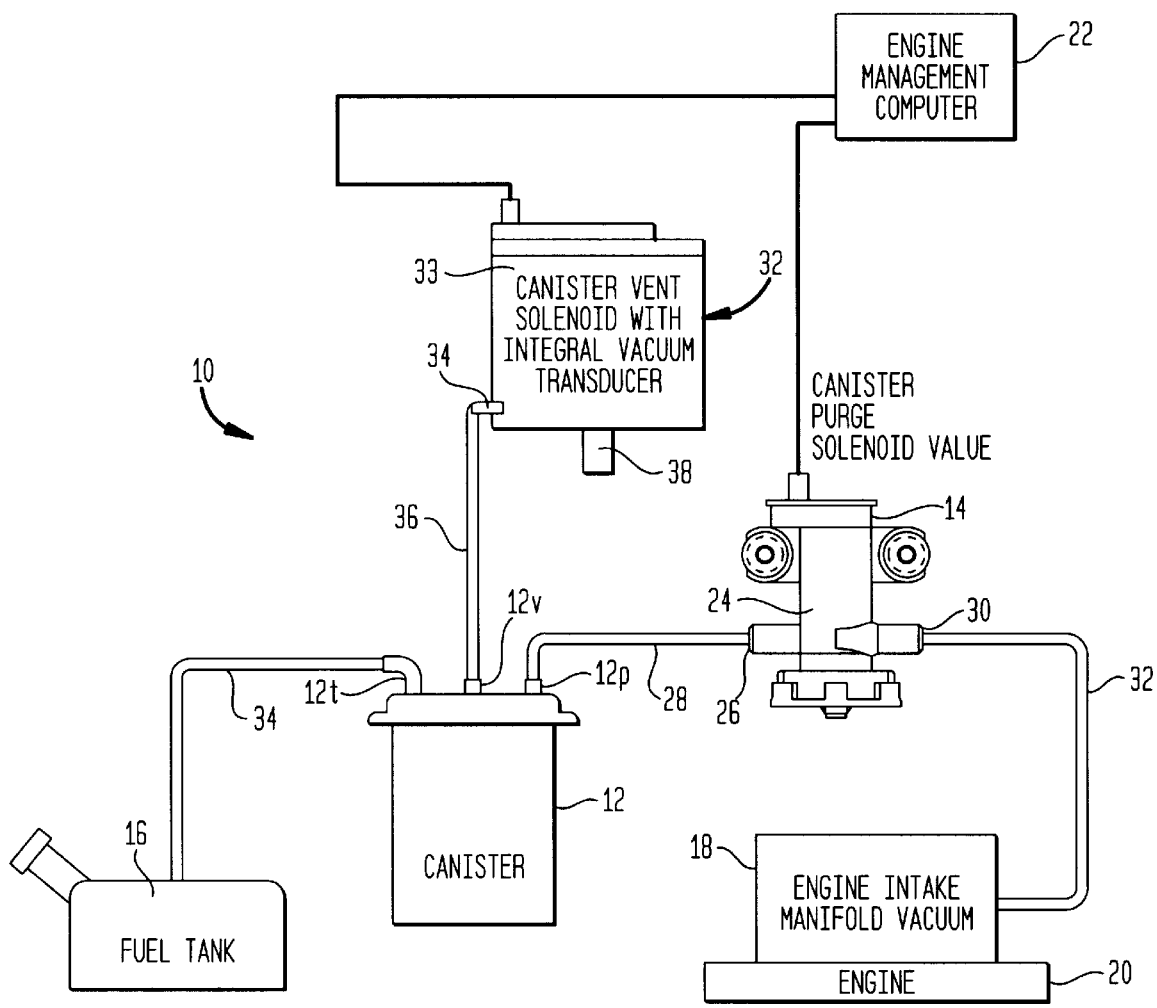
FIG. 1 is a schematic diagram of an evaporative emission control system embodying principles of the invention.

FIG. 1 shows an evaporative emission control system 10 of a motor vehicle comprising a vapor collection canister 12 and a canister purge solenoid valve 14 connected in series between a fuel tank 16 and an intake manifold 18 of an internal combustion engine 20 in a known fashion. An engine management computer 22 supplies a purge valve control signal for operating valve 14.

Valve 14 comprises a housing 24 having an inlet port 26 that is fluid-coupled via a conduit 28 with a purge port 12p of canister 12 and an outlet port 30 that is fluid-coupled via a conduit 32 with intake manifold 18. A conduit 34 communicates a canister tank port 12t to headspace of fuel tank 16. An operating mechanism comprising a solenoid actuator is disposed within housing 24 for opening and closing an internal passage that extends between ports 26 and 30. The mechanism includes a bias spring that acts to urge a valve element closed against a valve seat for closing the internal passage to flow. When the solenoid actuator is progressively energized by electric current controlled by engine management computer 22, an internal armature opposes the bias spring force to unseat the valve element from the valve seat and thus open the internal passage so that flow can occur between ports 26 and 30.

Canister 12 is also seen to comprises a vent port 12v to which a vent valve 32 embodying principles of the present invention is connected. Vent valve 32 comprises a walled housing 33 having a first port 34 that is fluid-connected with canister vent port 12v via a conduit 36 and a second port 38 that is communicated to atmosphere, preferably through a particulate filter (not shown), which is disposed either internal or external to housing 33. Detail of the internal construction of vent valve 32 appears in FIG. 2.

Housing 33 comprises two housing parts 33a, 33b of generally cylindrical shape that are assembled together to cooperatively form an enclosure having a generally cylindrical side wall 40 and opposite end walls 42, 44 bounding an interior space 46. Ports 34 and 38 are illustratively depicted as nipples that provide fluid communication into and out of interior space 46.

The nipple forming port 38 projects axially away from the center of end wall 44. Interiorly, end wall 44 comprises a circular valve seat surface 48 that circumscribes the passage defined by the nipple. Surface 48 and side wall 40 are substantially coaxial with an imaginary longitudinal axis 50 of housing 33. The interior of housing part 33b contains several integral walls 52 that serve both to define a receptacle for a solenoid assembly 58. Walls 52 are disposed at locations spaced circumferentially around interior space 46. Each wall 52 has a radially narrower portion 52a that extends axially along, and is integrally formed with, a portion of the axial length of side wall 40, and a radially wider, but axially shorter, portion 52b that is integrally formed with a portion of side wall 40 and a portion of end wall 44. Such shape provides each wall with a ledge surface 54 perpendicular to axis 50 and with an axial surface 56. These surfaces 54, 56 effectively form a receptacle for receiving, and properly internally locating, solenoid assembly 58. Walls 52 also provide a number of open channels 60.

Each channel 60 lies circumferentially between immediately adjacent walls 52 and extends axially to maintain fluid communication between opposite ends of interior space 46 once solenoid assembly 58 has been placed within its receptacle in the housing.

Solenoid assembly 58 has generally cylindrical shape for fitting snugly within the receptacle space provided by walls 52. Assembly 58 comprises a bobbin-mounted coil 62 and several ferromagnetic parts that provide an associated stator structure 64 forming a portion of the solenoid's magnetic circuit. A cylindrical ferromagnetic armature 66 is arranged coaxial with axis 50 and is guided within the bobbin for motion along axis 50. Armature 66 cooperates with stator structure 64 to complete the magnetic circuit.

A poppet mechanism 68 is disposed proximate end wall 44b. It comprises a valve element 70, which is assembled to a valve stem assembly 72, and a helical compression spring 74. Valve stem assembly 72 comprises a stem 76 having a circular flange 78 approximately half-way between its ends and a spring seat 80 at its lower end.

Valve element 70 is axially captured on the portion of stem 76 between flange 78 and spring seat 80, but is capable of limited axial travel between the two. One end of spring 74 is seated on a seat formation 82 in a portion of housing part 33b that circumscribes the passage of the nipple forming port 38 into the interior space 46. From there spring 74 extends to seat its opposite end on the outer circular margin of spring seat 80.

Figure 2:
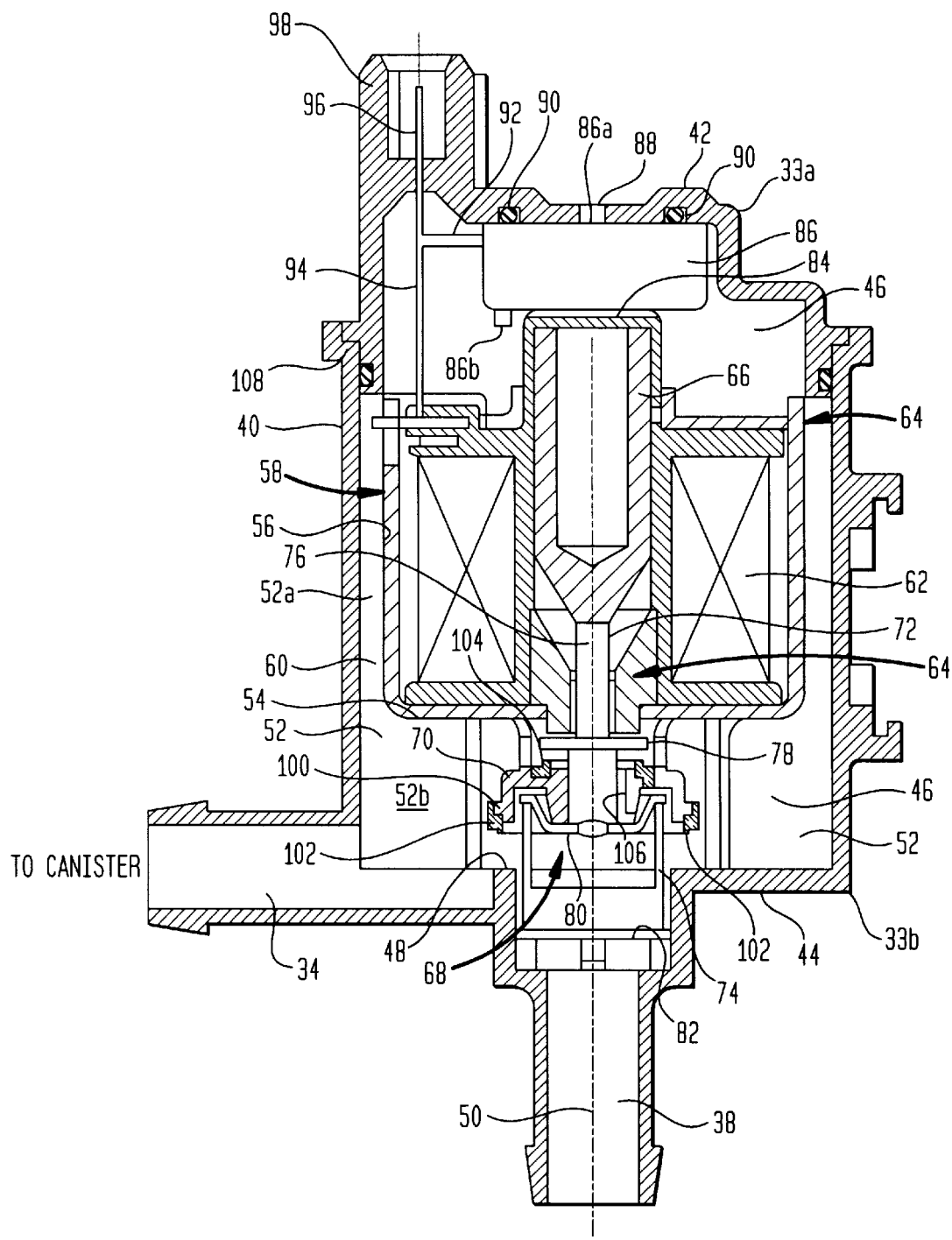
FIG. 2 is a longitudinal cross-sectional view through a canister vent valve embodying principles of the invention.

FIG. 2 shows the open condition of the vent valve wherein valve element 70 is unseated from valve seat surface 48 so that both ports 34, 38 and interior space 46 are in common communication. In this condition, spring 74 acts on spring seat 80, resiliently forcing valve stem assembly 72 away from seat surface 48. Spring seat 80 is shaped to act on valve element 70 so that the latter is forced to be unseated from seat surface 48. The bias force exerted by spring 74 on valve stem assembly 72 is transmitted to the nosed end of armature 66, causing the opposite flat end of the armature to be forced against a stop wall 84 that is a part of solenoid assembly 58.

A device 86 for providing to computer 22 an electric signal related to pressure within interior space 46 (either positive or negative or possibly both) is disposed axially between stop wall 84 and a portion of end wall 42. The specific device 86 described in FIG. 2 is a sensor for supplying an analog signal of the magnitude of vacuum within space 46, and it will be referred to as a sensor in the ensuing description. This sensor has a generally cylindrically shaped casing disposed generally coaxial with axis 50. It has a two pressure sensing zones 86a, 86b on opposite end faces. One zone 86a is located centrally on the face that is disposed against end wall 42, the other zone 86b is exposed to interior space 46. At the location of zone 86a, end wall 42 has a small through-hole 88 so that atmospheric pressure is communicated to zone 86a. A molded-in circular bead 90 is placed in a groove in end wall 42 so that zone 86a and hole 88 are sealed off from interior space 46.

Leads 92 from sensor 86 and leads 94 from solenoid coil 62 connect to respective electric terminals 96 mounted on housing part 33a. These terminals protrude through the housing wall in a sealed manner where they terminate within a surround 98 of part 33a to form a connector for mating connection with a wiring harness connector (not shown) to connect both the solenoid coil and the sensor with electric circuitry that includes engine management computer 22. The leads from sensor 86 may be integrated with the respective terminals 96 so that the integration provides individual terminals having bends as shown and extending from the sensor casing through the valve housing. The leads 94 may be respective terminals that mate with respective terminals 96 within the housing as the two housing parts are being fitted to each other to form a joint 108.

At all times, sensor 86 delivers an electric signal representing pressure within interior space 46 relative to atmosphere. When the vent valve is open that signal will be substantially at zero reference because the interior space 46 is being communicated to atmosphere. When the vent valve is closed, the signal will be representative of the pressure in the evaporative emission space, as communicated to interior space 46 through collection canister 12. Because the sensor is physically disposed on the vent side of the flow path through the canister, it is believed to be less sensitive to pressure fluctuations in the evaporative emission space, thereby providing a degree of signal damping that is apt not to be present if the sensor were exposed directly to the tank headspace, for example by being mounted on the top wall of the fuel tank. There may also be an economy in a vehicle's wiring because there is a common electrical connector for both the sensor and the vent valve.

When solenoid coil 62 is electrically energized, armature 66 is magnetically forced toward spring 74, increasingly compressing it in the process until a lip 100 at one end of valve element 70 that contains a molded-in circular bead 102 seals against seat surface 48 and flange 78 seals against a molded-in circular bead 104 on the opposite face of the valve element. The specific closing action occurs in the following sequence. Armature 66 pushes stem assembly 70 to further compress spring 74. After an initial increment of travel, flange 78 closes on bead 104 and begins to also push valve element 70. Motion ceases when the valve element lip 100 is sealed closed on seat surface 48. Valve element 70 contains a bleed passage 106, one end of which opens at the surface of the valve element that is bounded by bead 104, and the other end of which opens at an opposite surface location bounded by bead 102. When the vent valve is closed, bleed passage 106 is closed by the sealing of flange 78 with bead 104.

When the vent valve is to be opened, energization of solenoid coil 62 ceases, removing the magnetic force that had been acting to operate the valve closed. Spring 74 pushes stem assembly 72 and armature 66 away from seat surface 48, but valve element 70 does not unseat from surface 48 until it is abutted by the motion of spring seat 80, whereupon the valve element is carried by the stem assembly back to the position shown in FIG. 2. The initial opening motion of the stem assembly relative to the valve element opens bleed passage 106 to allow air to pass through the still-seated valve element, thereby providing at least some immediate reduction in pressure differential acting across the valve element which is helpful in aiding the unseating of the valve element from seat surface 48.

The housing parts may be suitable molded plastic material that are secured together in a sealed manner by any suitable means at the joint 108 after the internal components have been assembled. The stop wall 84 may be used to aid in axially capturing sensor 86 between itself and end wall 42.

Figure 3:
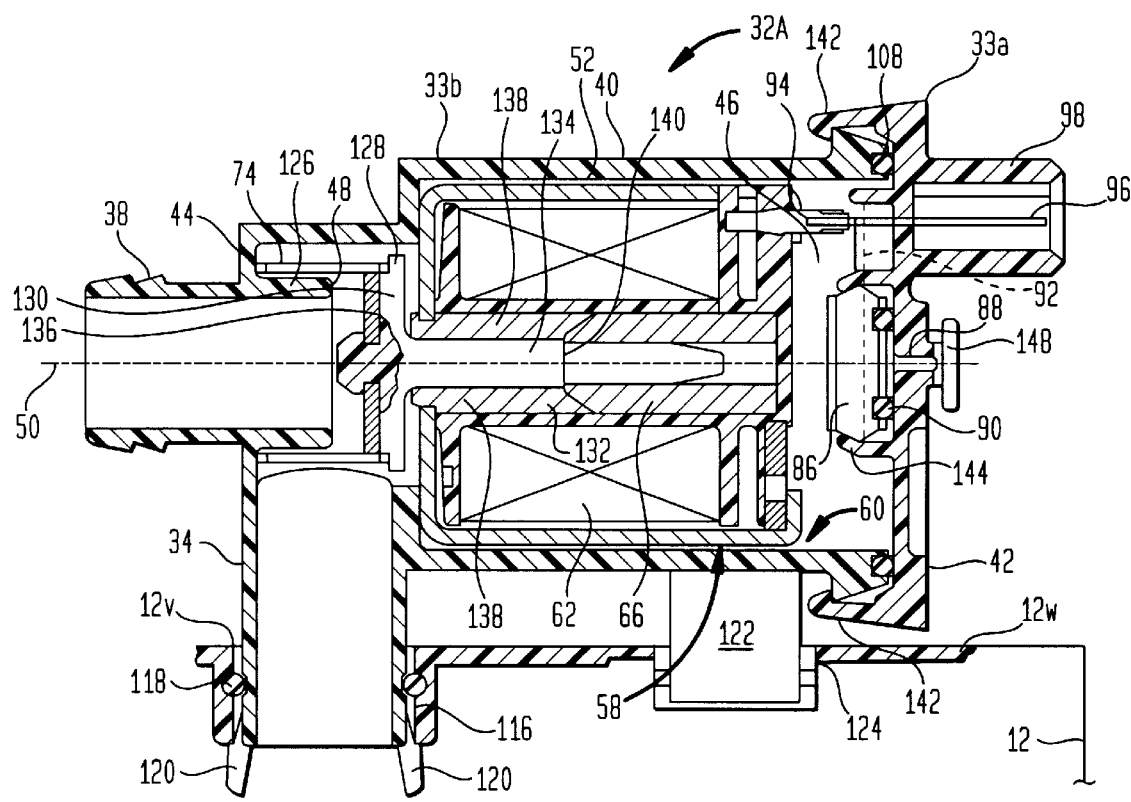
FIG. 3 is a longitudinal cross-sectional view through another canister vent valve embodying principles of the invention.

FIG. 3 discloses another embodiment of inventive vent valve 32A. The basic components of valve 32A for which valve 32 has corresponding components are identified by common reference numerals and valve 32A will be described with regard to its differences from valve 32.

Valve 32A is constructed for mounting directly on canister top end wall 12w. Housing part 33b is constructed such that the nipple forming port 34 snaps into a tubular walled hole 116 in canister wall 12w in a sealed manner. An O-ring 118 seals between the nipple and the wall of hole 116 to make the connection fluid-tight, and integral retainers 120 on the nipple, such as deflectable fingers, or barbs, secure the retention once the nipple has been inserted sufficiently far into hole 116.

Housing part 33b is also constructed with a locator projection 122 spaced from the connection of port 34 to the canister while canister wall 12w is constructed with a locator receptacle 124. Locator projection 122 and locator receptacle 124 fit closely together, even to the possible extent of a certain degree of press fit, both to properly orient the valve on the canister and to impart better stability to that mounting. By example, the projection and the receptacle may be cylindrical in shape, but it is possible that different shapes may be used and that a locator projection could be on the canister and a locator receptacle on the valve housing.

In valve 32A, valve seat surface 48 is at the inner end of a cylindrical wall 126 that forms an internal continuation of the nipple forming port 38. The non-traveling end of spring 74 is disposed around the outside of wall 126, and the traveling end engages a shoulder 128 of a head 130 of a valve element 132 that integrally includes a stem 134. A sealing disk 136 is affixed to the end face of valve head 130 for closing against seat surface 48 when the valve is operated closed. Thus the valve mechanism of valve 32A differs from that of valve 32. Travel of valve element 32A is guided by the fit of stem 134 within a tubular part 138 that forms a portion of the stator structure. The distal end of the stem fits within a central hole in armature 66, and the stem has a shoulder 140 that abuts the nosed end of the armature. Thus, the stem and valve head are embodied in a one-piece part, which may be a suitable plastic material, and it is not necessary that the stem be affixed to the armature because the bias of spring 74 will always urge shoulder 140 against the armature end.

Housing part 33a of valve 32A attaches by a snap-catch retention 142 over the end of housing part 33b. Part 33a also contains an integral means of retention 144 for mounting sensor 86 against an interior surface of the part. While the mounting location for the sensor is generally centered on the housing part, it could be located off center. A rain cap 148 is also formed on the exterior of part 33a over vent hole 88, but does not obstruct the flow through the vent hole.

Housing part 33b of valve 32A is constructed to have the internal walls 52 that form a receptacle for locating and holding solenoid assembly 58 and that define channels 60. The dimensions of these walls 52 are such that they may be used to control the effective flow area provided by the channels 60 and thereby in effect provide a damping effect between the evaporative emission space and sensor 86 that is additional to the fact that the sensor is remotely located from the evaporative emission space. This damping effect still provides for the sensor to give an accurate signal measurement, but fluctuations in vacuum, such as those due to fuel slosh, are damped. An example of a suitable sensor 86 is a Motorola MPX5100 or equivalent.

While a presently preferred embodiment of the invention has been illustrated and described, it should be appreciated that principles are applicable to other embodiments that fall within the scope of the following claims. For example, the inventive principles contemplate the use of various devices for device 86. One such other device is an electric pressure switch, an example of which is a Motorola MPL 500 Series, or equivalent.

What is claimed is:

1. In an automotive vehicle fuel system having a vent valve for selectively venting headspace of the fuel system to atmosphere, the improvement in the vent valve comprising:
   a housing having an enclosed interior space;
   an electric actuator disposed within the enclosed interior space;
   at least one sensor disposed within the enclosed interior space; and
   a single electrical connector provided on the housing proximate the enclosed interior space, the single electrical connector being operatively connected to both the electric actuator and the at least one sensor.

2. The canister vent valve of claim 1, wherein the at least one sensor comprises an electric pressure sensor that provides an electric signal measurement of pressure in the enclosed interior space relative to a reference pressure.

3. The canister vent valve of claim 2, wherein the electric pressure sensor comprises a reference pressure sensing zone and a measured pressure sensing zone, the reference pressure sensing zone being disposed against a wall of the housing and communicated to atmosphere through a hole in the wall, and the measured pressure sensing zone being open to the enclosed space.

4. The canister vent valve of claim 1, wherein the at least one sensor comprises a vacuum sensor that measures vacuum in the enclosed interior space.

5. The canister vent valve of claim 1, further comprising a valve element actuated by the electric actuator to selectively allow operative communication through the enclosed interior space.

6. The canister vent valve of claim 5, wherein the housing further comprises a first port and a second port, and wherein each of the first port and the second port communicates with the enclosed interior space.

7. The canister vent valve of claim 6, wherein one of the first port and the second port provides a valve seat within the enclosed interior space.

8. The canister vent valve of claim 7, wherein the valve element seals on the valve seat when the electric actuator is energized.

9. The canister vent valve of claim 8, wherein the valve element further comprises a lip that seals on the valve seat when the electric actuator is energized.

10. The canister vent valve of claim 9, wherein the electric actuator comprises a solenoid assembly having an armature that reciprocates within a coil.

11. The canister vent valve of claim 10, further comprising a valve stem assembly that operatively engages the armature, the valve stem assembly comprising a stem with a flange, a spring seat that captures the valve element on the stem adjacent the flange, and a spring that engages the spring seat and biases the valve stem assembly toward the armature.

12. The canister vent valve of claim 8, wherein the valve element includes a sealing disk that seals on the valve seat when the electric actuator is energized.

13. The canister vent valve of claim 12, wherein the electric actuator comprises a solenoid assembly with an armature that reciprocates within a coil.

14. The canister vent valve of claim 13, wherein the valve element further comprises: a valve stem assembly that operatively engages the armature; a valve head integrally connected to the valve stem, the sealing disk being disposed on the valve head, a shoulder on the valve head; and a spring that engages the shoulder and biases the valve element toward the armature.

15. The canister vent valve of claim 1, wherein the single electrical connector comprises electrical terminals connected to both the electric actuator and the at least one sensor.

16. In an automotive vehicle emission control system having an emission control valve for selectively controlling flow of gas through the valve, the improvement in the emission control valve comprising:
   a housing having an enclosed interior space;
   an electric actuator disposed within the enclosed interior space;
   an electric pressure sensor disposed within the enclosed interior space to sense a pressure condition of the gas; and
   a single electrical connector comprising multiple electric terminals provided on the housing proximate the enclosed interior space, the single electrical connector being operatively connected to both the electric actuator and the pressure sensor to provide for their connection with a remote electric circuit.

17. The improvement set forth in claim 16 in which the pressure sensor senses positive pressure and provides a signal thereof via terminals of the single electrical connector.

18. The improvement set forth in claim 16 in which the pressure sensor senses negative pressure and provides a signal thereof via terminals of the single electrical connector.

19. An emission control valve for use in an automotive vehicle emission control system to selectively control flow of gas in the system, the valve comprising:
   a housing having an enclosed interior space;
   an electric actuator disposed within the enclosed interior space;
   an electric pressure sensor disposed within the enclosed interior space to sense a pressure condition of the gas; and
   a single electrical connector comprising multiple electric terminals provided on the housing proximate the enclosed interior space, the single electrical connector being operatively connected to both the electric actuator and the pressure sensor to provide for their connection with a remote electric circuit.

* * * * *